Aug. 25, 1931.  F. H. OWENS  1,820,484

FOCUSING LENS MOUNT

Filed Dec. 16, 1929

INVENTOR.
FREEMAN H. OWENS,
BY
ATTORNEY.

Patented Aug. 25, 1931

1,820,484

UNITED STATES PATENT OFFICE

FREEMAN H. OWENS, OF NEW YORK, N. Y., ASSIGNOR TO OWENS DEVELOPMENT CORPORATION, OF NEW YORK, N. Y., A CORPORATION OF NEW YORK

FOCUSING LENS MOUNT

Application filed December 16, 1929. Serial No. 414,259.

My invention relates to a focusing lens mount and has particular reference to a means for focusing a photographic lens such as is commonly used in cameras, projectors and the like.

In the taking of motion pictures, it is particularly essential that the focus of the lens be accurate because of the type of lens used and I have provided a lens mount which is especially useful for that purpose.

The primary object of my invention is to provide a focusing means which permits both a coarse adjustment of the lens holder and a fine adjustment therefor whereby the operator may quickly set the focus to approximately the proper position and then by micrometer adjustment bring the lens holder into exact and perfect focus.

Other advantages and novel features will be apparent as the description proceeds, reference now being had to the figures of the accompanying drawings forming a part of this application and wherein like reference numerals indicate like parts.

In the drawings:—

Figure 1:
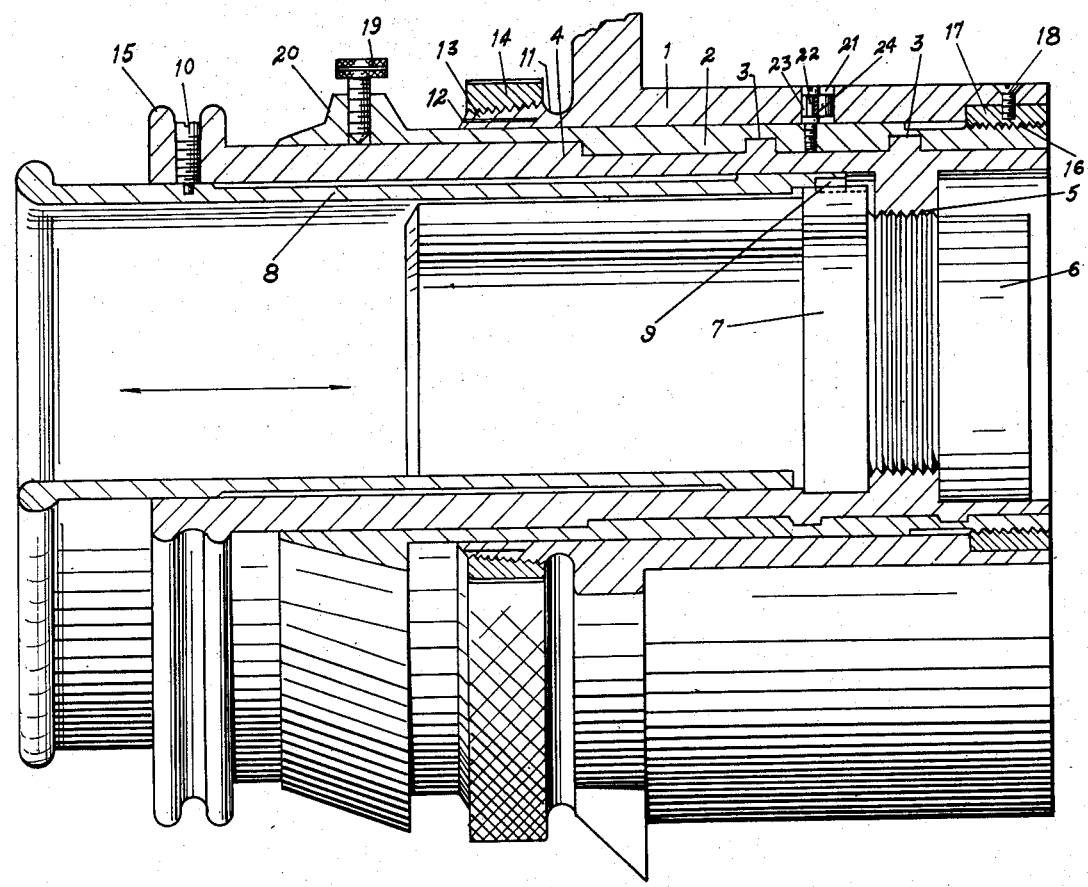
Figure 1 is a side view of my invention partly in section for clearness.
Figure 2:
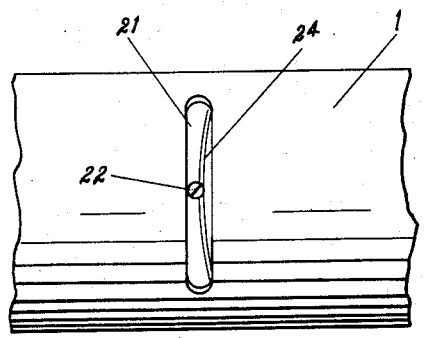
Figure 2 is a detail view of a portion of the apparatus.

The reference numeral 1 indicates a support which may be a portion of the camera casing and through an opening in which support is adapted to be rotatably and longitudinally adjustable, the lens carrier about to be described.

Rotatably mounted within the support 1 is a tubular member 2 provided on its inner surface with threads 3 of a coarse lead. Rotatably mounted within the tube 2 is a second tubular member 4 having threaded engagement with the threads 3 of the tube 2. The tube 4 is adjacent its rear end, threaded as at 5 to receive the threaded lens holder 6 within which may be disposed the photographic lens. This lens holder 6 also carries a diaphragm holder 7 within which is a diaphragm such as the common iris type. Rotatable within the tubular member 4 is a third tube 8 projecting beyond the front end of the tube 4 and at its rear or inner end having operative connection as at 9 with the diaphragm operating means. A set screw 10 may be provided at the outer end of the tube 4 for cooperation with a groove in the diaphragm adjusting tube 8 whereby the tube 8 is rotatable independently for adjusting the diaphragm, and which is longitudinally adjustable with the tube 4. It will be understood also that the threaded engagement between the lens holder 6 and the threads 5 of the tube 4 permit proper adjustment of the lens in such tube which adjustment is made once during the assembly of the device and seldom if ever, changed.

The support 1 is provided with a forward circular extension 11 encircling the tube 2. This extension 11 is slit inwardly as at 12 at various points about its circumference to render the same slightly resilient. The outer surface of this extension 11 is bevelled and threaded as at 13 to receive a threaded ring 14 which when screwed up tightly on the extension 11, serves to bind such extension tightly against the tube 2, thus holding the tube against rotation in the support 1.

Obviously, with the tube 2 thus locked against rotation, the tube 4 may be rotated by means of the finger piece 15 on the outer end of the tube whereupon the tube 4 and the lens holder 6 may be adjusted longitudinally by means of the coarse threaded engagement at 3 with the tube 2. This provides a coarse longitudinal adjustment for the lens holder 6.

When such adjustment has been made, it is desirable to be able to make a further and fine adjustment longitudinally of the lens holder and for this purpose, the tube 2 is provided at its rear end and externally for threaded engagement as at 16, with a threaded ring 17 suitably secured as by screws 18 in the support 1.

Obviously, therefore, if the clamping ring 14 be loosened so as to release the tube 2 from clamping engagement with the support 1, and the set screw 19 carried in an enlarged end 20 at the front of the tube 2, be tightened or screwed downwardly into engagement with the tube 4 whereby to lock the tubes 2 and 4 together, rotation of such tubes either by means of the finger piece 15 on tube 4 or the enlarged end 20 of the tube 2, will result in a fine adjustment longitudinally of the tubes 2 and 4 and therefore of the lens holder 6 with respect to the support 1, by virtue of the threaded engagement 16 between the tube 2 and the support 1.

When the adjustments have been made, the clamping ring 14 may again be tightened on the extension 11 whereby to securely lock the lens holder carrier, i. e., the tubes 2 and 4 with respect to the support.

In order that there may be no lost motion or play between the support 1 and the tube 2, due perhaps to improper fit or engagement at the threads 16, the support 1 may be slotted as at 21 through which slot a pin 22 extends and has threaded engagement with the tube 2. The headed pin lying in the groove 21 is notched as at 23 to receive a flat leaf spring 24 which tends to normally urge and hold the tube 2 through the medium of the pin 22 against longitudinal movement due to improper fitting or looseness in the threads 16.

The slot 21 is of course, long enough to permit the necessary rotation of the tube 2 with respect to the support 1 for the coarse adjustment above described.

Of course, changes may be made in details of construction and arrangement of parts without departing from the spirit and scope of my invention. I do not limit myself therefore to the exact construction herein shown and described other than by the appended claims.

I claim:

1. A focusing lens mount comprising a lens holder, a longitudinally adjustable carrier therefor, providing a coarse adjustment for said holder, and a supporting means within which said carrier is rotatable for longitudinal adjustment and adapted for locking engagement with said carrier and operable to adjust said carrier and holder longitudinally for a fine adjustment of said holder.

2. A focusing lens mount comprising a lens holder, a rotatable carrier for said holder, a supporting member within which said carrier is rotatable for longitudinally adjusting said holder, and means for locking said supporting member to said carrier, said carrier and supporting member then being rotatable together for longitudinally adjusting said holder.

In testimony whereof, I affix my signature.

FREEMAN H. OWENS.